United States Patent
Thompson et al.

(10) Patent No.: US 12,424,073 B2
(45) Date of Patent: Sep. 23, 2025

(54) GAS PRESSURE REGULATOR VALVE

(71) Applicant: Honeywell International Inc., Charlotte, NC (US)

(72) Inventors: Jason A. Thompson, Langhorne, PA (US); Michael Dank, Hatfield, PA (US)

(73) Assignee: Honeywell International Inc., Charlotte, NC (US)

( * ) Notice: Subject to any disclaimer, the term of this patent is extended or adjusted under 35 U.S.C. 154(b) by 147 days.

(21) Appl. No.: 18/224,412

(22) Filed: Jul. 20, 2023

(65) Prior Publication Data
US 2025/0029467 A1    Jan. 23, 2025

(51) Int. Cl.
G08B 21/12    (2006.01)
G05D 16/20    (2006.01)

(52) U.S. Cl.
CPC .......... G08B 21/12 (2013.01); G05D 16/20 (2013.01)

(58) Field of Classification Search
CPC .............................. G08B 21/12; G05D 16/20
USPC ....................................................... 340/632
See application file for complete search history.

(56) References Cited

U.S. PATENT DOCUMENTS

| | | | | |
|---|---|---|---|---|
| 5,954,089 A * | 9/1999 | Seymour | ............ | G05D 16/2033 700/282 |
| 9,995,486 B2 * | 6/2018 | Young | ............ | G05D 16/2033 |
| 10,151,405 B1 * | 12/2018 | Tebebi | ............ | F16K 37/005 |
| 10,576,318 B1 * | 3/2020 | Ringer | ............ | A62C 37/40 |
| 10,921,831 B2 | 2/2021 | Bragg | | |
| 2008/0308157 A1 * | 12/2008 | Zhuang | ............ | F16K 37/0066 137/553 |
| 2013/0153042 A1 * | 6/2013 | Young | ............ | F17D 5/02 137/487.5 |
| 2020/0182654 A1 * | 6/2020 | Kawauchi | ............ | G08B 21/16 |
| 2020/0209036 A1 | 7/2020 | Angus et al. | | |
| 2020/0309050 A1 * | 10/2020 | Xu | ............ | F02D 41/0027 |
| 2021/0335117 A1 | 10/2021 | Duggan et al. | | |
| 2022/0164333 A1 * | 5/2022 | Kim | ............ | G05B 9/02 |
| 2022/0170774 A1 | 6/2022 | Lampe-Juergens et al. | | |
| 2022/0196454 A1 | 6/2022 | Cornwall et al. | | |
| 2022/0198904 A1 | 6/2022 | Kann et al. | | |
| 2022/0219031 A1 * | 7/2022 | Prat | ............ | G08B 21/182 |
| 2023/0296209 A1 * | 9/2023 | Jensrud | ............ | F17C 13/025 62/49.2 |
| 2024/0385103 A1 * | 11/2024 | Wang | ............ | G01N 3/08 |

* cited by examiner

*Primary Examiner* — Zhen Y Wu
(74) *Attorney, Agent, or Firm* — Paschall & Associates, LLC; James C. Paschall; Anthony Miologos

(57) ABSTRACT

An apparatus and method that monitors gas pressures at a gas pressure regulator valve is disclosed. The gas pressure regulator valve includes an inlet pressure detector for sensing an inlet gas pressure applied to the gas pressure regulator and an outlet pressure detector configured to sense an outlet gas pressure supplied by the gas regulator valve. A memory records the inlet gas pressure and the outlet gas pressure and a computing unit operably coupled to the memory analyzes the recorded inlet gas pressure and the outlet gas pressure to detect a change in the inlet and/or the outlet gas pressure and to generate a notification to indicate the operational status of the gas pressure regulator valve. A communication unit communicatively coupled to the computing unit transmits the notification and the inlet gas pressure and the outlet gas pressure to a gas utility operating the gas supply system.

18 Claims, 5 Drawing Sheets

GAS PRESSURE REGULATOR VALVE

TECHNICAL FIELD

This disclosure is generally directed to gas pressure regulator valves. More specifically, it relates to a gas pressure regulator valve capable of reporting its operational status.

BACKGROUND

Current known installations that supply natural gas to residential and commercial customers use mechanical diaphragm based gas pressure regulator valves with conventional metering devices to maintain a constant output gas pressure to appliances and devices using the natural gas regardless of variations from the supply input pressure. Generally, the gas pressure regulator valve receives natural gas at an inlet port from a utility supply line at a high pressure. The gas regulator reduces and stabilizes the input natural gas to a regulated lower pressure that is output from an outlet port to supply the regulated natural gas to the customer's gas appliances and devices. A precisely controlled natural gas pressure, and the resulting flow, to the residential or commercial customer is beneficial to safely power the natural gas appliances installed at the customer's location.

The gas pressure regulator valve installed in front of a conventional gas meter has an expected gas inlet pressure and outlet pressure. However, without having a separate reporting device, such as for example a smart gas meter in front of or after the regulator, it is not known to the utility in real time if the regulator is performing as expected. Smart gas meters typically include hardware that facilitates communication with external devices or systems for reporting the resulting flow through the smart meter as well as abnormalities such as gas leakage or a reduction in pressure. Therefore, it would be beneficial to provide a gas regulator valve that could communicate if the inlet pressure and outlet pressure are operating as expected to a utility supplying natural gas to residential and commercial customers.

SUMMARY

This disclosure relates to a gas pressure regulator valve capable of reporting its operational status.

In a first embodiment, an apparatus for monitoring gas pressures at a gas pressure regulator valve is disclosed. The gas pressure regulator valve comprises, an inlet pressure detector configured to sense an inlet gas pressure applied to the inlet port from a gas supply system and an outlet pressure detector configured to sense an outlet gas pressure supplied by the gas regulator valve. A memory records the inlet gas pressure and the outlet gas pressure and a computing unit operably coupled to the memory is configured to analyze the recorded inlet gas pressure and the outlet gas pressure to detect a change in the inlet and/or the outlet gas pressure and to generate a notification to indicate the operational status of the gas pressure regulator valve. A communication unit communicatively coupled to the computing unit transmits the notification and the inlet gas pressure and the outlet gas pressure to a gas utility operating the gas supply system.

In a second embodiment a method for monitoring gas pressures at a gas regulator valve is disclosed. The gas regulator valve receives gas from a gas supply system operated by a gas utility delivering the gas to a gas consumer. The method comprises sensing a supply gas pressure delivered by the gas supply system to the gas regulator valve and a demand gas pressure supplied by the gas regulator valve to a gas consumer. The method further comprises, recording the sensed supply gas pressure and the demand gas pressure and analyzing the recorded supply gas pressure and the demand gas pressures to detect a change in the supply gas pressure and/or the demand gas pressure and generate a notification to indicate the operational status of the gas pressure regulator valve and transmitting the notification to a gas utility operating the gas supply system using a communication unit.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
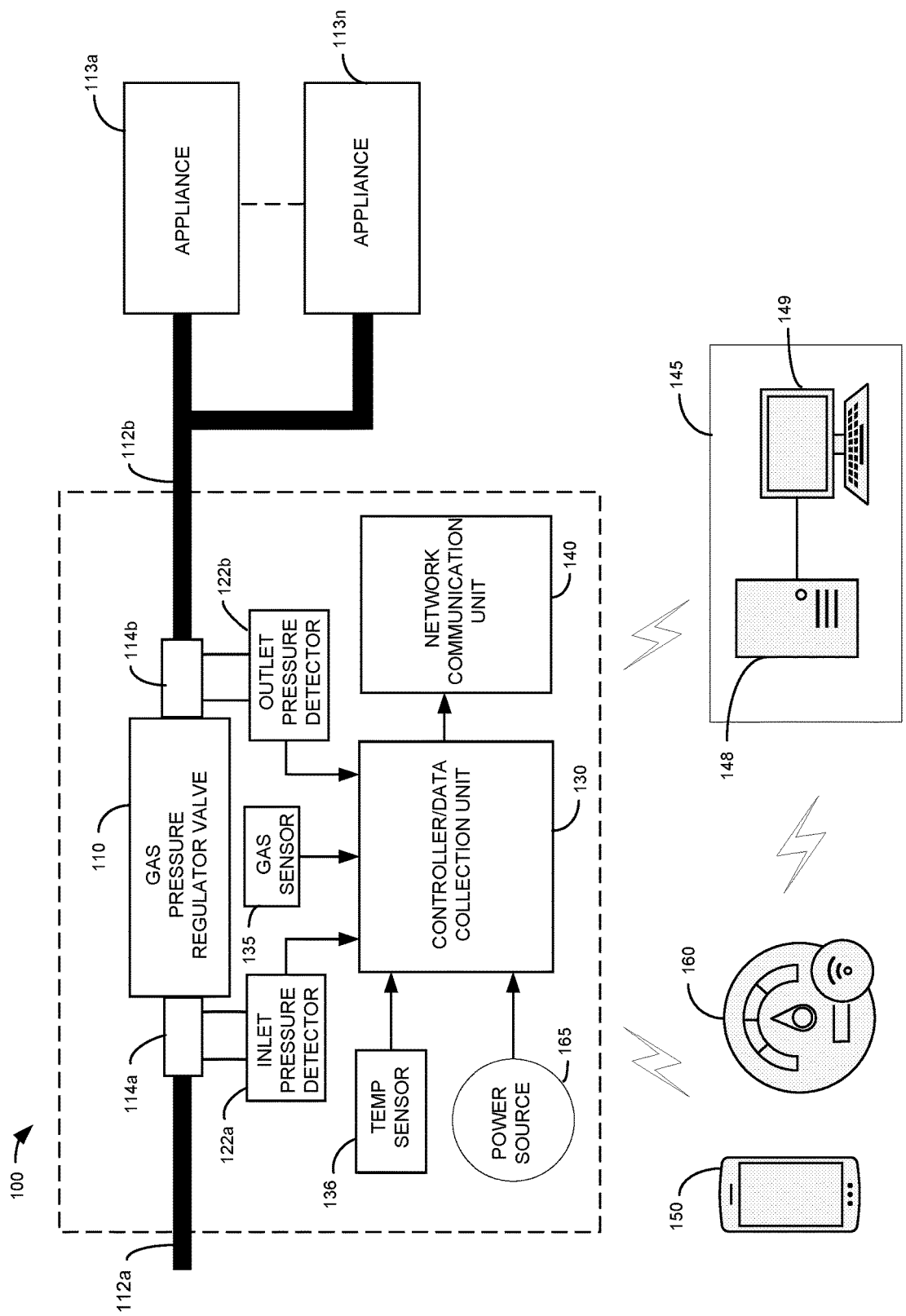
FIG. 1 is a block diagram illustrating the devices of an example gas pressure regulator system according to an embodiment of the present disclosure.

FIGS. 1-6, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Gas pressure regulator valves (also known as gas regulators, pressure control valves, pressure regulating valves) regulate the pressure in a pressurized gas system. A gas regulator allows pressurized gas to flow through an orifice, and when the gas exits the valve, the gas pressure is reduced or stabilized or both. Generally, a flexible diaphragm is attached to a seat disk by a mechanical linkage. The diaphragm covers an internal chamber such that one side of the diaphragm is exposed to atmospheric pressure and the other side of the diaphragm is exposed to the gas. The pressurized gas flows through an inlet orifice that can be opened and closed by the seat disk and the linkage, which are attached to the diaphragm. The diaphragm is also attached to a spring and a calibration screw. The screw can compress the spring in order to change the steady state force on the diaphragm to adjust the regulated pressure set point. The diaphragm moves in response to the balance between pressure inside the regulator and the spring. For example, when the downstream pressure exceeds the regulated set point (such as when the pressure is too high) the diaphragm and the linkage move the disk to close the orifice. When the downstream pressure drops below the regulated set point (such as when the pressure is too low) the disk is moved to open the orifice to allow more gas pressure to flow into the regulator. That is, the diaphragm moves in response to the balance between the pressure inside the regulator and the adjustment spring force. Additionally, gas pressure regulators can include an internal pressure relief valve to open when the regulated gas pressure rises above a safe operation pressure. The gas pressure regulator valve typically is a component part of a gas meter set installed in a residence or the like of a customer, to modulate the gas measured at the gas meter. The gas utility collects usage information displayed on a meter to obtain the amount of gas used by the customer.

Typically, gas pressure regulator valves are purely mechanical devices that only regulate gas pressure entering the gas meter. In currently known residential or commercial deployments when a mechanical gas pressure regulator valve fails, the gas regulator shuts down, shutting off the customer from the gas supply. In certain other failures, high downstream pressure and an increased occurrence of relief events could occur when an orifice/seat disk seal is damaged preventing the gas pressure regulator valve from properly locking up. Unless the customer contacts his gas utility the gas utility has no knowledge of the failure of the gas pressure regulator valve.

FIG. 1 is a block diagram of the devices comprising a gas pressure regulator system 100 according to an exemplary embodiment of the present disclosure. The embodiment of the gas pressure regulator system 100 illustrated by the block diagram shown in FIG. 1 is for illustration only. Other embodiments can be used without departing from the scope of the present disclosure. In FIG. 1, the gas pressure regulator system 100 includes a gas pressure regulator valve 110 that has been installed at a customer's location as part of a gas meter set (not shown) installed and maintained by a gas utility. The gas pressure regulator valve 110 includes an inflow pipe 112a connected to an inlet port 114a of the gas pressure regulator valve 110. The inflow pipe 112a supplies gas from a gas grid to the inlet port 114a of the gas pressure regulator valve 110. An outflow pipe 112b is connected to an outlet port 114b on a service side of the gas pressure regulator valve 110. Gas to a plurality of gas appliances 113a, 113n are connected on a downstream side of outflow pipe 112b.

The gas pressure regulator system 100 further includes an inlet pressure detector 122a installed on inlet port 114a. The inlet pressure detector 122a measures the inlet pressure of the gas supplied by the grid to the pressure regulator valve 110. The inlet pressure detector 122a is arranged to convert the pressure at the inlet of the gas pressure valve 110 to gas pressure data signals. An outlet pressure detector 112b is installed on outlet port 114b. The outlet pressure detector 122b measures the service gas pressure supplied by the gas pressure regulator valve 110. The outlet pressure detector 122b converts the pressure readings to gas pressure data signals corresponding to the service pressure readings applied to outflow pipe 112b. It will be well understood by those skilled in the art that the inlet pressure detector 122a may be installed to the inflow pipe 112 upstream from, or adjacent to, the inlet port 114a. Similarly, the outlet pressure detector 122b may be installed to the outflow pipe 112b downstream from, or adjacent to, the outlet port 114b.

The gas pressure data signals representing the inlet grid pressure and outlet supply pressure are transmitted for storage and processing to a controller/data collection unit 130. Controller 130 analyzes the pressure data received from both the inlet pressure detector 122a and the outlet pressure detector 122b and compares the received gas pressure data signals to predefined limits and setpoints stored in a memory unit of the controller 130. The controller 130 uses the received gas pressure data signals to analyze and determine the existence of abnormal pressure measurements at both the inlet port 114a and outlet port 114b. The method used by the controller 130 for determining an abnormal pressure will be explained in detail later.

The controller/data collection unit 130 further receives signals from a gas sensor 135 connected in proximity to the gas pressure regulator valve 110. The ability to detect and report fugitive emissions strongly aligns with certain goals of many utilities to be more sustainable and monitor their emissions. The gas sensor 135 is arranged to detect fugitive gas emissions, such as methane ($CH_4$) gas indicative of a natural gas leak. However, the gas sensor 135 may also have capability to detect other gases that may be present in the gas line such as hydrogen or biogas. Such a gas leak may be caused by a broken or faulty regulator, a broken or damaged inlet pipe or port or any of its mechanical fittings, or a broken or damaged outlet pipe or port or any of its mechanical fittings. The sensor 135 produces and sends gas data signals to the controller 130. The controller 130 uses the received gas data signals to determine if a gas leak has occurred and to therefore indicate a fugitive gas leak caused by a damaged mechanical fitting or relief events.

The system 100 further includes a temperature sensor 136 that may be used to provide the temperature of the gas pressure regulator valve 110 or the temperature of the gas supplied by the grid to the gas regulator valve 110. The temperature sensor 136 converts temperature readings to temperature data signals transmitting the temperature data signals to the controller 130. The controller 130 uses the temperature data signals for correlation studies in order to ascertain the temperature of the gas pressure regulator 110 or the temperature of the gas when the failure occured. For example, at a high ambient temperature or at a low ambient temperature.

The system 100 further includes a network communication unit 140 that can send alarms, notifications, and data to a monitoring station 145 of the gas utility when the controller determines an abnormality 130. The network communication unit 140 may be a wireless broadband communication device operating using a long-term evolution (LTE) communication protocol based on GSM/EDGE and UMTS/HSPA standards. The wireless telecommunication signals from the network communication unit 140 are transmitted to the monitoring station 145 and received by a monitoring system operating on a server 148 and displayed to a maintenance or other operator on an operator station 149. The network communication unit 140 can transmit alarms, notifications and pressure data generated by the controller unit 130, such as for example, a pressure below normal notification and a low-pressure alarm, pressure above normal notification and a high-pressure alarm, low battery alarms, and relief events that have been detected by system 100. The gas utility can use the received alarms, notification, and data to track gas pressure regulator valves that have been experiencing regular alarming issues to identify those requiring maintenance and/or replacement and also to initiate investigation of the grid upstream plant or downstream service piping.

Figure 2:
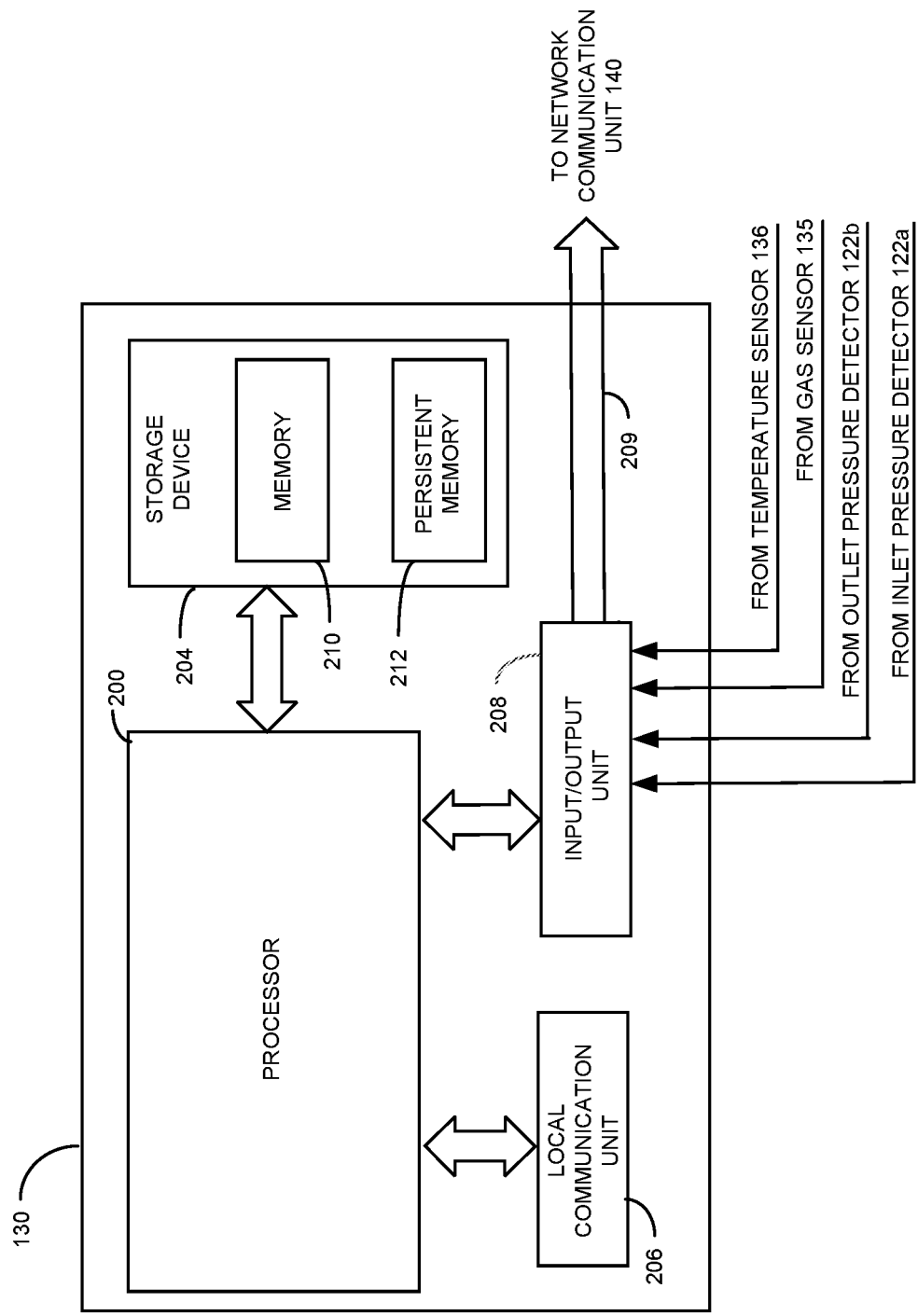
FIG. 2 is block diagram illustrating the devices of an example controller/data collection unit according to an embodiment of the present disclosure.

In another embodiment, the controller 130 may also include a local communication unit 206, shown in FIG. 2, that can establish communications using local communication protocols such as for example near field communication (NFC) or Bluetooth communication protocols. The local communication unit 206 may be used to communicate with a network communication unit of a nearby smart meter 160. The local communication unit 206 may be used to transmit the abnormal pressure alarms, notifications, and pressure data to a nearby smart meter 160 which uses its network communication unit to transmit the alarms, notifications, and pressure data to the monitoring station 145 of the gas utility. In another embodiment, the local communication unit 206 may also be used to send data and reports as well as receive instructions from, a mobile handheld device 150 used by a maintenance operator to communicate with the system 100. The maintenance operator may use handheld device 150 to check on the operation of the system 100, download data from the controller 130, or upload updates to the operating software executing on controller 130.

A power source 165, such as a battery provides energy to power the components of system 100. Preferably, the power source 165 may comprise a long-life Lithium-Ion battery, however, the system 100 may use any other type of battery, such as for example batteries using NiCad or NiMH cells, or other forms of energy, such as from wired electrical sources, or from solar cells.

FIG. 2 illustrates an example of the controller/data collection unit 130 of the present disclosure. The controller 130 is used by system 100 to run applications to perform one or more functions, such as for example, monitoring and analyzing the gas pressure data signals received from the gas pressure regulator system 100, generating alarms and notifications for transmission by the network communication unit 140 or the local communication unit 206 based on the operational status of the gas pressure regulator system 100. The controller 130 may also control the recording and storing of gas pressure data signals, temperatures data signals and gas data signals from the gas pressure regulator valve 110, temperature sensor 136 and gas sensor 135.

As shown in FIG. 2, the controller 130 includes at least one processor 200, at least one storage device 204, at least one local communications unit 206, and at least one input/output (I/O) unit 208. Each processor 200 can execute instructions, such as those that may be loaded into storage device 204. Each processor 200 denotes any suitable processing device, such as one or more microprocessors, microcontrollers, digital signal processors, application specific integrated circuits (ASICs), field programmable gate arrays (FPGAs), or discrete circuitry.

The memory 210 and a persistent storage 212 are examples of storage devices 204, which represent any structure(s) configured to store and facilitate retrieval of information (such as data, program code, and/or other suitable information on a temporary or permanent basis). The memory 210 may represent a random access memory or any other suitable volatile or non-volatile storage device(s). The persistent storage 212 may contain one or more components or devices supporting longer-term storage of data, such as a read-only memory, hard drive, Flash memory, or optical disc.

The communications unit 206 supports communications with other systems or devices. For example, the communications unit 206 could include at least one wireless transceiver facilitating local communications over at least one wireless network. The communications unit 206 supporting local communications through any suitable local physical or wireless communication link(s) such as for example wireless link(s) employing NFC or Bluetooth communication protocols.

The I/O unit 208 allows for input and output of data to and from processor 200. For example, the I/O unit 208 may provide an interface to the processor 200 for the input of the data signals from the inlet and outlet pressure detectors 122a and 122b, gas sensor 135 and temperature sensor 136. Alarms, notifications, and stored data signals may be developed by the processor 200 for transmission to the network communication unit 140 via transmission line 209.

Figure 3:
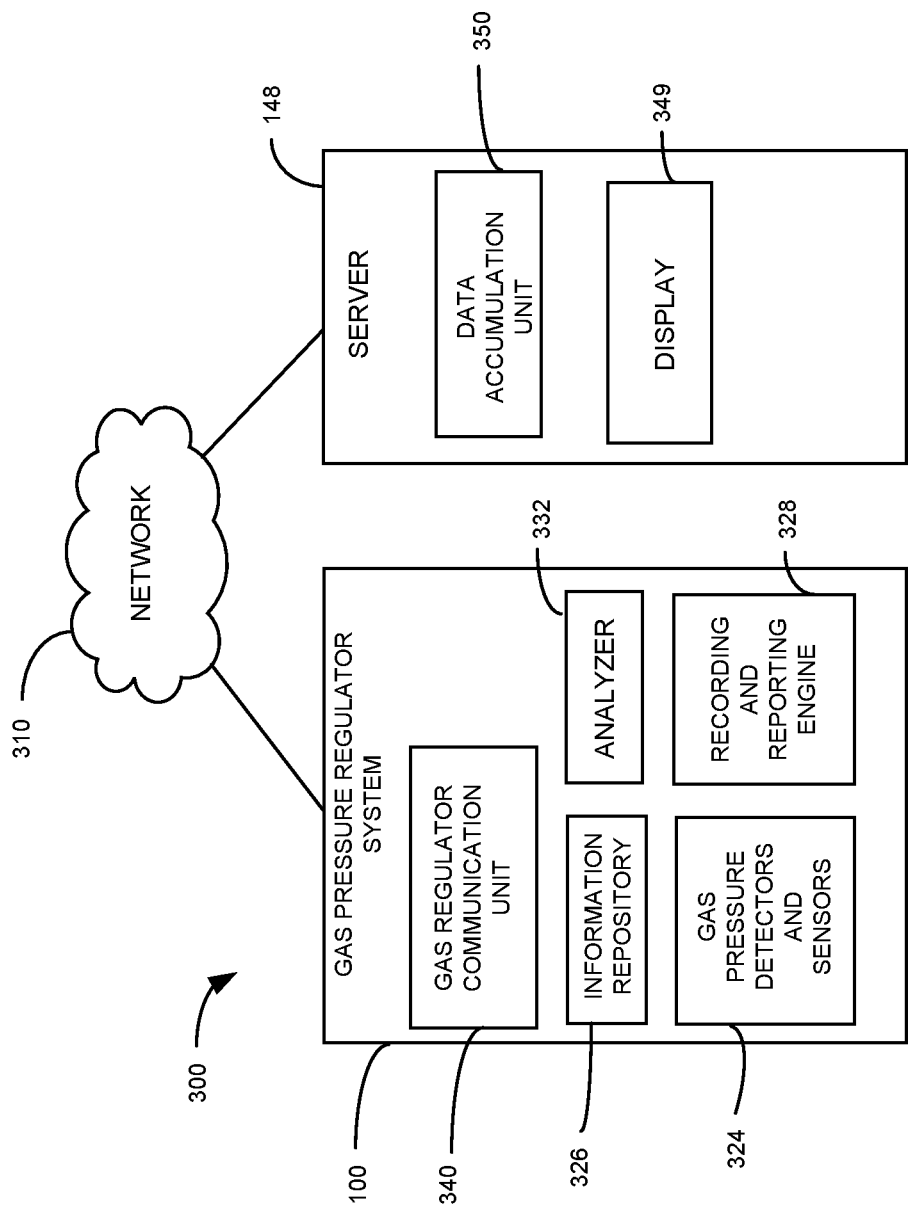
FIG. 3 is block diagram illustrating an example gas pressure regulator system according to an embodiment of the present disclosure.

FIG. 3 illustrates an example block diagram of the gas pressure regulator system 300 according to this disclosure. FIG. 3 illustrates a high-level architecture, in accordance with an embodiment of this disclosure. The embodiment of the block diagram 300 shown in FIG. 3 is for illustration only. Other embodiments can be used without departing from the scope of the present disclosure. Block diagram 300 includes the gas pressure regulator system 100 and the server 148, interconnected and capable of communicating via network 310.

In certain embodiments, network 310 includes a larger networking environment. For example, network 310 can be used for communication between the gas pressure regulator system 100 and the server 148 as well as to provide communication between the pressure regulating system 100 and additional servers and equipment (not shown). For example, network 310 can be connected to an information repository (i.e., a database) at the server 148 that contains historical data pertaining to the gas pressure regulating system 100 or additional sensors associated with the gas pressure regulating system.

In certain embodiments, network 310 represents a "cloud" of computers interconnected by one or more networks, where network 310 is a computing system utilizing clustered computers and components to act as a single pool of seamless resources when accessed. In certain embodiments, network 310 represents a wireless network that can range in size from Near Field Communication (NFC) to Local Area Networks (LAN) to wide area networks (WAN). In certain embodiments, network 310 provides access to the internet or other remote networks.

As discussed above, the gas pressure regulator valve 110 of gas pressure regulator system 100 regulates the pressure of gas supplied to the gas pressure regulator system 100. The gas pressure regulator valve 110 allows high pressure gas to flow through an orifice, and when the gas exits the valve, the gas pressure is reduced or stabilized or both. The gas pressure regulator valve 110 operates in conjunction with gas pressure detectors and sensors 324, a recording and reporting engine 328, an information repository 326, an analyzer 332 and a gas regulator communication unit 140.

Gas pressure detectors and sensors 324 may include the inlet gas pressure detector 122a, the outlet gas pressure detector 122b connected to the gas pressure regulator valve 110 shown in FIG. 1. The inlet gas pressure detector 122a measures the inlet or grid pressure of the gas from the grid connected to the gas pressure regulator valve 110 and the outlet gas pressure detector 122b measures the gas supplied from the gas pressure regulator valve 110 to appliances 113a and 113n. The gas pressure detectors 122a and 122b are arranged to measure a physical quantity and convert the detected information into a gas data signal. As explained in FIG. 1, the sensors may also include a gas sensor 135 for detecting fugitive gas emissions near the gas pressure regulator valve 110 and the temperature sensor 136. The temperature sensor 136 provides the temperature of the gas pressure regulator valve 110 or the gas supplied to the gas pressure regulator valve.

The recording and reporting engine 328 monitors and controls the recording and reporting of the gas pressure and other sensor data detected by the gas pressure detectors and sensors 324. In certain embodiments, the recording and reporting engine 328 instructs the gas pressure detectors and sensors 324 to capture and record the pressure readings of the gas pressure regulating valve 110 at predetermined intervals or at different sampling rates. The recordation's can occur multiple times a day to several times a week, and anywhere in-between. In certain embodiments, the recording and reporting engine 328 can instruct the temperature sensor 136 and the gas sensor 135 to also record sensed temperature and gas data signals into the information repository at the predestined time intervals or sampling rates. It is noted that each predetermined time intervals can be the same or different. For example, the recording and reporting engine 328 can instruct the information repository 326 to record the gas pressure data signals from detectors 122a and 122b at predetermined intervals and forward the data to the analyzer after a certain number of recordings. The recording and reporting engine 328 can be implemented as an operating program stored in the storage device 204 and executed by processor 200 of the controller/data collection unit 130.

The information repository 326 can be implemented using any architecture known in the art such as, for example, a relational database, an object-oriented database, or one or more tables, or a combination thereof. It can be contained in the memory 210 of storage device 204. Information repository 326 stores data captured by the gas pressure detectors and sensors 324. For example, the information repository 326 stores the gas pressure data signals representing gas pressure measurements from both the inlet grid pressure detector 122a and the outlet supply pressure detector 122b. Similarly, repository 326 may also store temperature data signals in the information repository 326. The information repository 326 may also receive and store data of any current or past fugitive gas emissions detected by gas sensor 135. In certain embodiments, the information repository 326 overwrites the recorded data at predetermined periods. For example, the recording and reporting engine 328 can instruct the information repository 326 to overwrite previous data after the successful transmission of the recorded data to the server 148 (or after a certain number of successful transmissions). In another example, the information repository 326 can maintain the data for a predetermined period of time.

The analyzer 332 analyzes the gas pressure data signals received from detectors 122a and 122b and stored in the information repository 326. The analyzer 332 detects a minimum, a maximum or a setpoint pressure reading for the gas data signals input by each detector 122a and 122b. In certain embodiments, the analyzer 332 compares the pressure readings received to a baseline associated with the gas pressure regulating valve 110 and determines whether a deviation from the baseline has occurred. Deviation from the normal baseline signifying pressure, or flow rate changes of the gas, due to gas pressure regulating valve 110 starting to fail: or the gas pressure regulating valve 110 having already failed. If the analyzer 332 determines that a deviation from the baseline is due to normal expected changes to the system 100, the analyzer 332 determines that the gas pressure regulating valve 110 is functioning properly.

However, when a deviation from the baseline readings is detected due to an abnormal deviation from the baseline the recording and reporting engine 328 instructs the controller 130 to generate and transmit to the gas regulator communication unit 340 an alarm notification along with an identification of the valve system 100 that has the abnormal situation. In one embodiment, the gas regulator communication unit 340 may be the network communication unit 140.

In certain other embodiments, the gas regulator communication unit 340 may be the local communication unit 206. The gas regulator communication unit 340 transmits the alarm, notification, valve ID and the recorded gas pressure data signals from the information repository 326 to the server 148 via the network 310. In certain other embodiments, the gas regulator communication unit 340 may transmit only the recorded gas pressure data signals from the information repository 326 and the valve ID. The server 148 using an analyzer executing in server 148 would compare the pressure readings received to predetermined alarms limits and historical data to determines whether a deviation has occurred and generate alarms for display to the operator.

A data accumulation unit 350 located in server 148 receives the alarms, notifications, the pressure data, and ID of the alarming gas pressure regulator valve system 100. The alarm, notification and pressure data is displayed on display 349 together with ID identification data of the gas valve. In certain embodiments display 349 may comprise operator console 149 that is used to instruct a plant operator to perform a remedying action. In certain embodiments, the remedying action can include sending maintenance personnel to investigate the valve and/or replacing or repairing the faulty gas pressure regulating valve 110. It should be noted that the alarms, notifications, pressure data and valve ID sent using the local communication unit 206 is made using a nearby smart meter 160 which in turn uses its network communication unit to transmit the alarms, notifications, pressure data and valve ID to the server 148.

Figure 4:
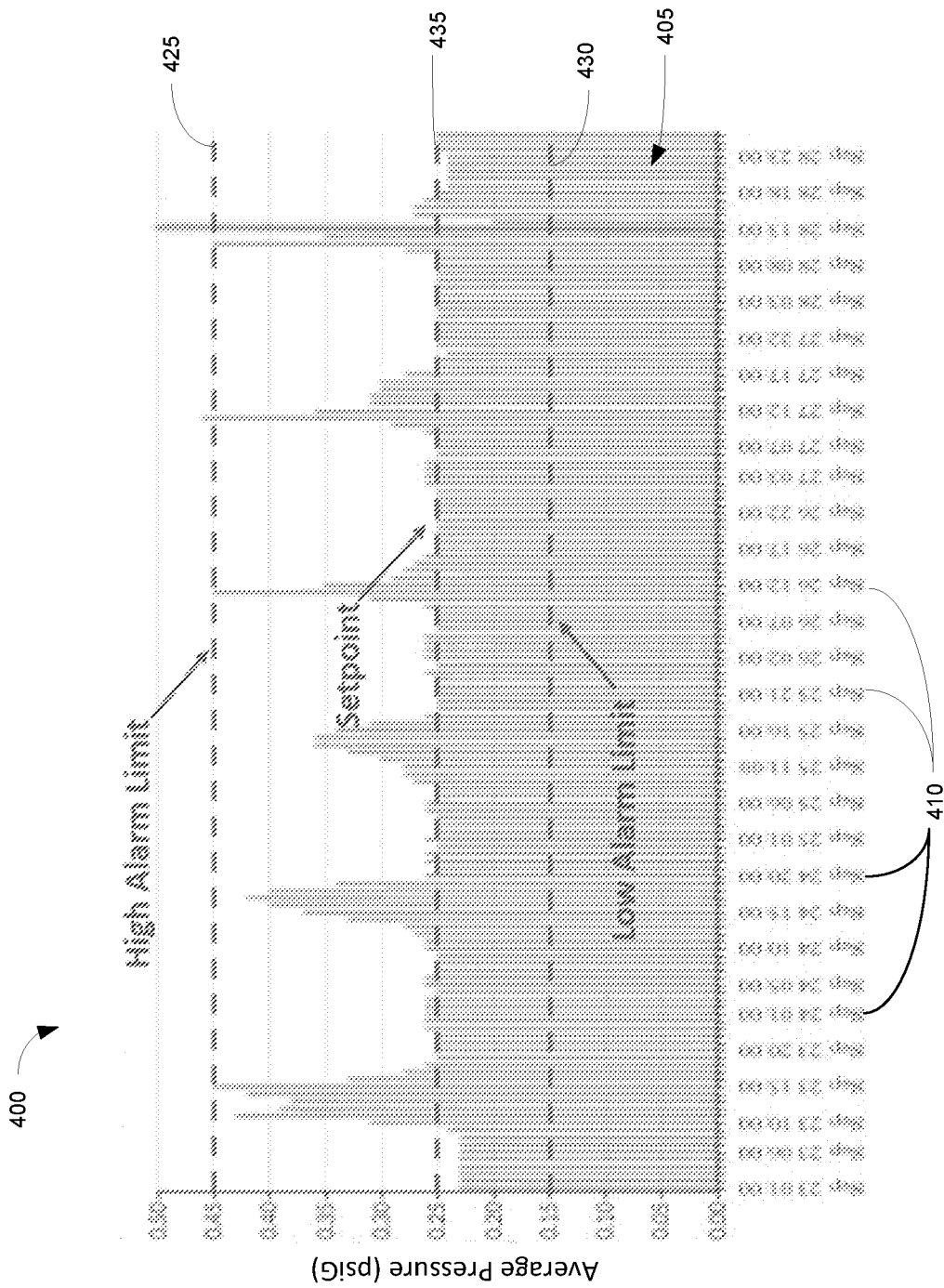
FIG. 4 is a graph explaining the gas pressure measurement data recorded by the information repository according to an embodiment of the present disclosure.

FIG. 4 illustrates a graph 400 of the gas pressure data signals 405 recorded by the information repository 326. Gas pressure data signals 405 are recorded to the information repository 326 at specific intervals 410 as instructed by the recording and reporting engine 328. Graph 400 provides an example of the gas pressure data signals developed by outlet gas pressure detector 122b of the service gas pressure supplied by the gas pressure regulator valve 110. A similar set of gas pressure data signals would be stored in the information repository 326 for the grid gas pressure measured by the inlet gas pressure detector 122a.

At the time of collection or at predetermined intervals, the analyzer 332 would compare the gas pressure data signals to a predetermined high alarm limit 425, low alarm limit 430 or to an average setpoint 435. The average setpoint 435 signifies an average normal operation of the gas pressure regulator valve 110. The analyzer 332 would trigger the processor 200 to send alarms and notifications when the high alarm limit 425 or the low alarm limit 430 exceed or fall below the pressure limits set in the analyzer 332. The gas pressure data signals collected for the grid pressure would also have similar alarm high, low limits and setpoint readings that would trigger alarms and notifications as explained above for the supply gas pressure data signals.

In another embodiment the analyzer 332 may be arranged to use a baseline pressure performance curve, which would be established during commissioning of the gas pressure regulator system 100 or when changes occur upstream/downstream of the regulator 110 in order to identify changes to expected regulator response. In certain embodiment this could be in the form of average readings throughout the day. In other embodiments the identification of fluctuations could take the form of comparisons between the inlet and outlet pressure, or potentially slight fluctuations in pressure as demand downstream causes the gas pressure regulator valve 110 seat disk to open or lockup.

Figure 5:
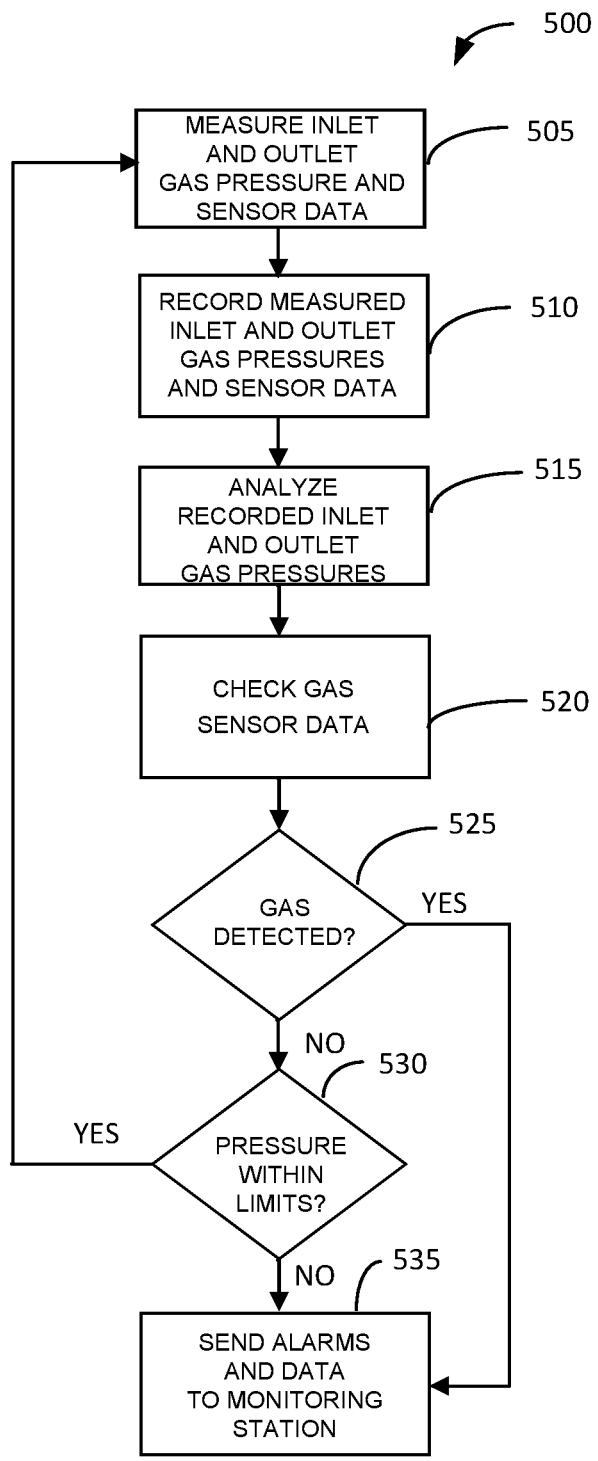
FIG. 5 is an example method for collecting, storing, analyzing, and transmitting alarms and notifications when an abnormal pressure is detected according to an embodiment of the present disclosure.

FIG. 5 is an example method 500 for collecting, storing, analyzing, and transmitting alarms and notifications when an abnormal pressure is detected by an associated gas pressure regulator valve 110 according to this disclosure. The steps in FIG. 5 can be performed by gas pressure regulating system 100.

At step 505, the recording and reporting engine 328 instructs information repository 326 to start recording and store of the gas pressure data signals sensed at the inlet gas pressure detector 122a and the outlet gas pressure detector 122b at predetermined intervals. The recordation's can occur multiple times a day to several times a week, and anywhere in-between. In certain embodiments, the recording and reporting engine 328 can instruct the temperature sensor 136 and the gas sensor 135 to also record sensed temperature data signals and gas data signals into the information repository at predestined time intervals. It is noted that each predetermined time intervals can be the same or different. For example, the recording and reporting engine 328 can instruct the sensor to record the data signals to the information repository at predetermined intervals and forward the data to the analyzer after a certain number of recordings. The data may also include measurements from the gas sensor 135 of fugitive gas emissions near the gas pressure regulator valve 110 and the temperature sensor 136. The temperature sensor 136 provides the temperature of the gas pressure regulator valve 110 or the gas supplied to the regulator valve 110.

Next in step 510, the information repository 326 stores gas pressure data signals data captured by the gas pressure detectors. For example, the information repository 326 stores the gas pressure data signals representing gas pressure measurements from both the inlet grid pressure detector 122a and the outlet supply pressure detector 122b. Similarly, repository 326 may also store the temperature data signals in the information repository 326. The information repository 326 may also receive and store gas data signals of any current or past fugitive gas emissions detected by gas sensor 135.

Next in step 515, the analyzer 332 analyzes the gas pressure data signals received from detectors 122a and 122b and stored in the information repository. The analyzer 332 compares the measurements to a minimum, a maximum or a setpoint pressure reading for the recorded gas pressure data. In certain embodiments, the analyzer 332 compares the pressure readings received to a baseline associated with the gas pressure regulating valve 110 and determines whether a deviation from the baseline has occurred. Deviation from the normal baseline signifying, pressure, or flow rate changes of the gas, due to gas pressure regulating valve 110 starting to fail: or the gas pressure regulating valve 110 having already failed. If the analyzer 332 determines that a deviation from the baseline is due to normal expected changes to the system 100, then the analyzer 332 determines that the gas pressure regulating valve 110 is functioning properly.

In step 520, the analyzer 332 checks the sensor data from the gas sensor 135 for the presence of methane gas. If methane gas is detected at step 525, the method jumps to step 535 that sends alarms and notifications of the detection of fugitive gas emissions to the monitoring station 145 along with the gas pressure regulator valve ID using the gas regulator communication unit 340.

In step 530 the analyzer 332 determines if the gas pressure data signals recorded are within set limits as was explained above. If the gas pressure data recorded for either the grid pressure or supply pressure deviate from the preset limits or deviate from a normal baseline, then the analyzer 332 sends instructions to the recording and reporting engine 328 to send alarms and notifications at step 535 of the abnormal pressure readings to the monitoring station 145 using the gas regulator communication unit 340. The communication unit 140 transmits the alarm, notification, valve ID and the recorded pressure data signals from the information repository 326 to the server 148 via the network 310.

If no gas was detected in step 525 and the gas pressure measurements fall within acceptable limits in step 530, the method returns to step 505 to measure gas pressure at the inlet gas pressure detector 122a and the outlet gas pressure detector 122b at the next predetermined interval as explained above.

It may be advantageous to set forth definitions of certain words and phrases used throughout this patent document. The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," or "controller" within a claim is understood and intended to refer to structures known to those skilled in the relevant art, as further modified or enhanced by the features of the claims themselves and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus for monitoring gas pressure of a gas pressure regulator valve, the apparatus comprising:
   an inlet pressure detector configured to sense an inlet gas pressure applied to an inlet port of the gas pressure regulator valve;
   an outlet pressure detector configured to sense an outlet gas pressure supplied to an outlet port of the gas pressure regulator valve;
   a gas sensor configured to sense a fugitive gas emissions proximity to the gas pressure regulator valve;
   a memory for recording the inlet gas pressure and the outlet gas pressure;

a computing unit operably coupled to the memory configured to:
  determine if a gas leak has occurred proximal to the gas pressure regulator valve;
  in response to determining that the gas leak has occurred proximal to the gas pressure regulator valve, analyze the recorded inlet gas pressure and the outlet gas pressure to detect a change in the inlet gas pressure and/or the outlet gas pressure;
  in response to detecting a change in the inlet gas pressure and/or the outlet gas pressure, generate a notification to indicate an operational status of the gas pressure regulator valve; and
a communication unit communicatively coupled to the computing unit for transmitting the notification and the inlet gas pressure and the outlet gas pressure to a gas utility operating a gas supply system.

2. The apparatus of claim 1, wherein the apparatus further comprises:
  a temperature sensor configured to detect temperature of the gas pressure regulator valve, wherein signals representing detection of a gas emission and the temperature of the gas pressure regulator valve are recorded in the memory.

3. The apparatus of the claim 2, wherein the computing unit comprises a processor configured to:
  record the inlet gas pressure and outlet gas pressure at a predetermined time intervals;
  analyze the recorded inlet gas pressure and outlet gas pressure by comparing the inlet gas pressure and the outlet gas pressure to threshold values recorded in the memory; and
  generate an alarm to the gas utility if values of the inlet gas pressure or the outlet gas pressure deviate from the recorded threshold values.

4. The apparatus of the claim 3, wherein the communication unit is communicatively coupled to an operator station at the gas utility, the processor configured to:
  send the alarm and notifications along with an identification of the gas pressure regulator valve and the recorded inlet and outlet gas pressure to the operator station using the communication unit when the values of the inlet gas pressure or the outlet gas pressure deviate from the recorded threshold values.

5. The apparatus of the claim 2, wherein a processor is configured to:
  analyze the signals representing the detection of a gas emission; and
  generate an alarm and notifications to the gas utility when a gas emission is detected.

6. The apparatus of the claim 1, wherein the communication unit is communicatively coupled to a server located at the gas utility, the server configured to:
  receive the notification along with an identification of the gas pressure regulator valve and the inlet gas pressure and outlet gas pressure to the server from the communication unit;
  analyze the inlet gas pressure and outlet gas pressure by comparing the inlet gas pressure and the outlet gas pressure to threshold values recorded at the server; and
  generate an alarm to an operator station operably coupled to the server when values of the inlet gas pressure or the outlet gas pressure deviate from threshold values.

7. The apparatus of the claim 1, wherein the communication unit is a wireless communication device operating on a communication network.

8. The apparatus of the claim 7, wherein the communication network is a cellular network using a long-term evolution (LTE) communication protocol based on GSM/EDGE and UMTS/HSPA standards.

9. The apparatus of the claim 7, wherein the communication network is a cloud of computers interconnected by one or more communication networks in a wireless wide area network (WAN).

10. The apparatus of the claim 7, wherein the communication network is a local wireless network operating using a near filed communication (NFC) or Bluetooth communication protocol.

11. A method for monitoring gas pressures at a gas pressure regulator valve that receives gas from a gas supply system operated by a gas utility and that delivers gas to a gas consumer, the method comprising:
  sensing a supply gas pressure delivered by the gas supply system to the gas regulator valve;
  sensing a demand gas pressure supplied by the gas regulator valve to a gas consumer;
  sensing a fugitive gas emissions proximity to the gas pressure regulator valve;
  recording the supply gas pressure and the demand gas pressure;
  determining if a gas leak has occurred proximal to the gas pressure regulator valve;
  in response to determining that the gas leak has occurred proximal to the gas pressure regulator valve, analyzing the recorded supply gas pressure and the demand gas pressures to detect a change in the supply gas pressure and/or the demand gas pressure; and
  in response to detecting a change in the supply gas pressure and/or the demand gas pressure, generate a notification to indicate an operational status of the gas pressure regulator valve; and
  transmitting using a communication unit the notification to a gas utility operating the gas supply system.

12. The method of claim 11, wherein the method further comprises:
  sensing a temperature of the gas pressure regulator valve; and
  recording signals representing the detection of a gas emission and the temperature of the gas pressure regulator valve.

13. The method of the claim 11, wherein the method further comprises:
  recording using a recording and reporting engine at predefined time intervals the supply gas pressure and the demand gas pressure in an information repository;
  analyzing the recorded supply gas pressure and demand gas pressure by an analyzer that compares the supply gas pressure and the demand gas pressure to threshold values recorded in the information repository; and
  generating an alarm as well as the notification by the recording and reporting engine for transmission by the communication unit to the gas utility if values of the supply gas pressure or the demand gas pressure deviate from the recorded threshold values.

14. The method of the claim 13, wherein the method is further configured to:
  record signals representing detection of a gas emission in the information repository;
  analyze the recorded signals representing the detection of a gas emission using an analyzer;
  generate an alarm as well as the notification by the recording and reporting engine; and transmit the alarm and notification to the gas utility using the communication unit.

15. The method of claim 13, wherein the gas utility includes a server communicatively coupled to the communication unit, the method further comprising:
   receiving by the server the notification from the communication unit along with an identification of the gas pressure valve and the supply gas pressure and the demand gas pressure;
   analyzing by the server the supply gas pressure and demand gas pressure by comparing the supply gas pressure and the demand gas pressure to threshold values recorded at the server; and
   generating an alarm to an operator station operably coupled to the server when values of the supply gas pressure and/or the demand gas pressure deviate from threshold values.

16. The method of the claim 11, wherein the communication unit operates wirelessly on a communication network.

17. The method of the claim 16, wherein the communication network is a cellular network using a long-term evolution (LTE) communication protocol based on GSM/EDGE and UMTS/HSPA standards.

18. The method of the claim 16, wherein the communication network is a local wireless network operating using a near filed communication (NFC) or Bluetooth communication protocol.

* * * * *